Patented July 4, 1939

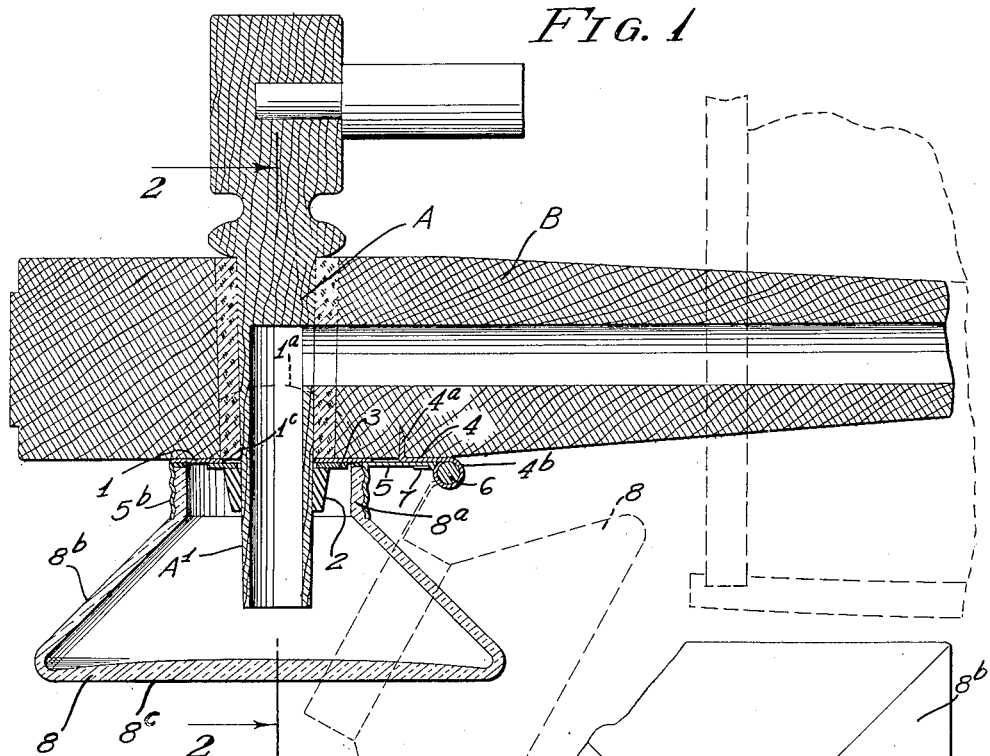

2,164,666

UNITED STATES PATENT OFFICE 2,164,666

SANITARY AUTOMATIC FAUCET PROTECTOR

Charles M. Simmons, San Diego, Calif.

Application April 27, 1937, Serial No. 139,177

6 Claims. (Cl. 137—111)

My invention relates to sanitary automatic faucet protectors and the objects of my invention are:

First, to provide a faucet protector which is particularly adapted for use in conjunction with wooden syrup faucets around which insects and the like collect due to the sweetness of the syrup;

Second, to provide a faucet protector of this class which not only seals the nozzle against insects but protects the nozzle against dust and other deleterious matter;

Third, to provide a faucet protector which may be secured without the use of tools to the various types and designs of faucets;

Fourth, to provide a faucet protector which is automatically shifted clear of the faucet nozzle when a cup, glass, or other object to be filled is moved into the proper receptive relation with the faucet;

Fifth, to provide a faucet protector which automatically returns to its sealing position when the operation of the faucet is completed;

Sixth, to provide a faucet protector which requires no change in the construction of the faucet to which it is attached and does not interfere with or modify its operation;

Seventh, to provide a faucet protector which retains drippings or the like discharged from the faucet when not in use and prevents these drippings from entering a receptacle into which it is desired to discharge the liquid from the faucet;

Eighth, to provide a faucet protector which may be readily maintained in a clean sanitary condition; and Ninth, to provide a novelly constructed faucet protector which is simple of construction, economical of manufacture, durable, efficient in its action, and which will not readily deteriorate or get out of order.

With these and other objects in view as will appear hereinafter, my invention consists of certain novel features of construction, combination, and arrangement of parts and portions as will be hereinafter described in detail and particularly set forth in the appended claims, reference being had to the accompanying drawing and to the characters of reference thereon which form a part of this application in which:

Figure 1 is a fragmentary sectional view of a faucet shown in connection wtih a fragmentary portion of a keg shown in dash lines and showing my faucet protector in relation with the faucet in section, and also showing by dotted lines a shifted position of the protector; Fig. 2 is a sectional view from the line 2—2 of Fig. 1; Fig. 3 a top or plan view of my faucet protector alone, separate from the faucet; and Fig. 4 is a sectional view from the line 4—4 of Fig. 2.

Similar characters of reference refer to similar parts and portions throughout the several views of the drawing.

The retainer member 1, supporting washer 2, washer 3, fixed arm 4, movable arm 5, hinge pin 6, spring 7, and cup 8, constitute the principal parts and portions of my sanitary automatic faucet protector.

The usual faucet structure with which my protector is particularly suited includes a nozzle member A and provided with a slightly tapered nozzle tip A1. The nozzle member is turnable in a wooden faucet structure B shown positioned in a fragmentary portion of a keg in Fig. 1 of the drawing. The retainer member 1 includes a cylindrical portion 1a, having at its sides a curved portion 1b which fits around the lower side of the faucet structure B and is provided with an orifice in its lower side 1c to permit the faucet tip A1 to extend therethrough. From the lower edge of the member 1a extends the fixed arm 4 which is provided with an upwardly extending prong portion 4a which is adapted to be driven into the lower side of the faucet structure B and serves to prevent this member 4 and the member 1 from turning with the turning of the faucet nozzle. This portion 4a is preferably cut from material of member 4 and bent upwardly. At the extended end of the fixed arm 4 is provided a pair of hinge elements 4b, which coact with other hinge elements 5a of the movable arm 5 and with the hinge pin 6 to form a hinge structure. The arm 5 is flat and normally extends along the under side of the arm 4 in contiguous relation thereto. The arm 5 is yieldably held in such contiguous relation by spring 7 which is wound around a portion of the hinge pin 6, which is provided with enlarged ends 7a and 7b tending to hold said members 4 and 5 in contiguous relation as shown in Fig. 1 of the drawing.

This movable arm 5 is provided with a downwardly extending threaded cylindrical portion 5b in which is screw threaded the upper conforming cylindrical threaded portion 8a of the cup 8. This cup 8 is provided with outwardly flanged portion 8b extending downwardly and outwardly in all directions from the cylindrical portion 8a and is provided with a bottom portion 8c. This cup member 8 is preferably made of glass and is rectangular so as to provide a flat side at the front as shown best in Fig. 3 of the drawing for engagement with a cup or glass for shifting this cup member 8 to the position shown by dotted lines in Fig. 1 of the drawing preparatory to drawing liquid from the faucet.

Mounted around the tip A1 of the faucet nozzle is a washer 3 which rests against the lower curved side of the retainer member portion 1b and fitting against the lower side of this washer 3 and fitting tightly so that it is stretched on the nozzle tip A1 is a rubber washer 2 which holds the retainer 1 in position in snug relation with the lower side of the faucet structure B and supported on the tip A1. This together with the prong 4a provides a securing means for the faucet protector.

The portion 8b of the cup 8 forms a cam which is so shaped and arranged that pressure from a glass, cup, or other receptacle causes the cup and arm 5 to rotate around the hinge pin 6 as indicated by dotted lines 1 in Fig. 1 of the drawing, and when the glass is removed, the arm 5 automatically shifts to its upper position against the retainer 1 so as to enclose the nozzle tip A1. Any drippings or the like which fall from the nozzle tip A1 are collected in the cup 8. The cup 8 is made deep enough and is so shaped and arranged so that it may still retain a considerable quantity of liquid when the arm 5 has shifted to a position in which a glass or receptacle is underneath the nozzle tip. Thus, ordinarily the drippings are retained in the cup, but when it is desired to empty the cup, it is unscrewed from the portion 5b and the contents emptied, or if desired, it may be moved beyond its normal position and part of the contents permitted to drain out.

It will be here noted that the back portion of the flange 8b may be omitted and the back side of the cup extend straight downwardly from the portion 8a, which will permit further backward movement of the cup.

The protector is secured to the nozzle end by first arranging the retainer and with the cup in open position as shown by dotted lines in Fig. 1, placing the washer 3 over the tip and then forcing the rubber washer 2 upon the tapered tip, forcing the same into position at the same time pressing the prong 4a into the lower side of the faucet structure B.

Though I have shown and described a particular construction, combination, and arrangement of parts and portions, I do not wish to be limited to this particular construction, combination, and arrangement, but desire to include in the scope of my invention the construction, combination, and arrangement substantially as set forth in the appended claims.

Having thus described my invention, what I claim as new and desire to secure by Letters Patent is:

1. In a faucet protector of the class described, the combination with a nozzle tip of a fixed arm extending laterally from said nozzle tip, a movable arm hinged to said fixed arm at its extended end, a depending cup mounted on said movable arm and adapted to register with the nozzle tip, supporting washers associated with said fixed arm and secured around said nozzle tip, yieldable means normally retaining said movable arm in closed position, said depending cup provided with a downwardly diverging cam surface extending from one side thereof, said cam surface arranged to rotate said movable arm against action of said yieldable means upon the movement of a receptacle into registry with said nozzle tip.

2. In a faucet protector of the class described the combination with a nozzle member of a fixed arm projecting laterally from said nozzle member, supporting washers associated with said fixed arm surrounding the tip of said nozzle member, a movable arm hinged to said fixed arm, a cup member associated with said movable arm arranged to coact with said supporting washers, yieldable means for holding said movable arm in coactive relation with said fixed arm, and a cam shaped cup means secured to said movable arm for shifting said movable arm clear of said nozzle member upon a movement of a receptacle into registry with said nozzle member.

3. In a faucet protector of the class described the combination with a nozzle member of a fixed arm projecting laterally from said nozzle member, supporting washers associated with said fixed arm surrounding the tip of said nozzle member, a movable arm hinged to said fixed arm, a cup member associated with said movable arm arranged to coact with said supporting washers, yieldable means for holding said movable arm in coactive relation with said fixed arm, and a cam shaped cup means secured to said movable arm for shifting said movable arm clear of said nozzle member upon a movement of a receptacle into registry with said nozzle member and said cam means from one side of the cup depending on said movable arm.

4. In a faucet protector of the class described the combination with a nozzle member of a fixed arm projecting laterally from said nozzle member, supporting washers associated with said fixed arm surrounding the tip of said nozzle member, a movable arm hinged to said fixed arm, a cup member associated with said movable arm arranged to coact with said supporting washers, yieldable means for holding said movable arm in coactive relation with said fixed arm, and a cam shaped means secured to said movable arm for shifting said movable arm clear of said nozzle member upon a movement of a receptacle into registry with said nozzle member and said cam means from one side of the cup depending on said movable arm and said cup being shaped, arranged, and constructed to retain a quantity of drippings in any position assumed during the movement of said receptacle into registry with the nozzle member.

5. In a faucet protector of the class described, the combination with a faucet nozzle tip of a retainer member, a distortable washer arranged to fit the nozzle tip of the faucet and hold said retainer on said faucet, a fixed arm extending from said retainer member, a movable arm hinged to said fixed arm, and a cup secured to said movable arm.

6. In a faucet protector of the class described, the combination with a faucet nozzle tip of a retainer member, a distortable washer arranged to fit the nozzle tip of the faucet and hold said retainer on said faucet, a fixed arm extending from said retainer member, a movable arm hinged to said fixed arm, a cup secured to said movable arm, and yieldable means in connection with said fixed arm and said movable arm tending to hold said arms in close relation to each other and said cup over said faucet nozzle tip.

CHARLES M. SIMMONS.